No. 637,174. Patented Nov. 19, 1901.
G. L. ZUCKER.
PACKAGE.
(Application filed Aug. 14, 1901.)
(No Model.)
Fig. 1.
Fig. 2.
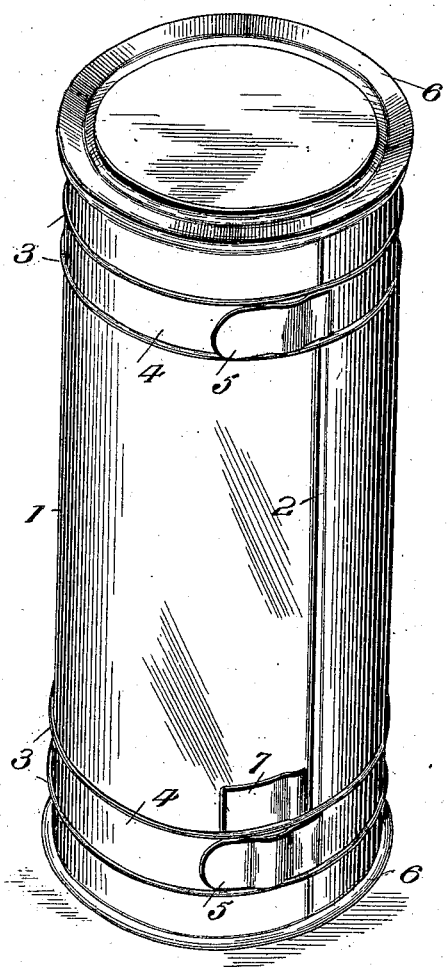
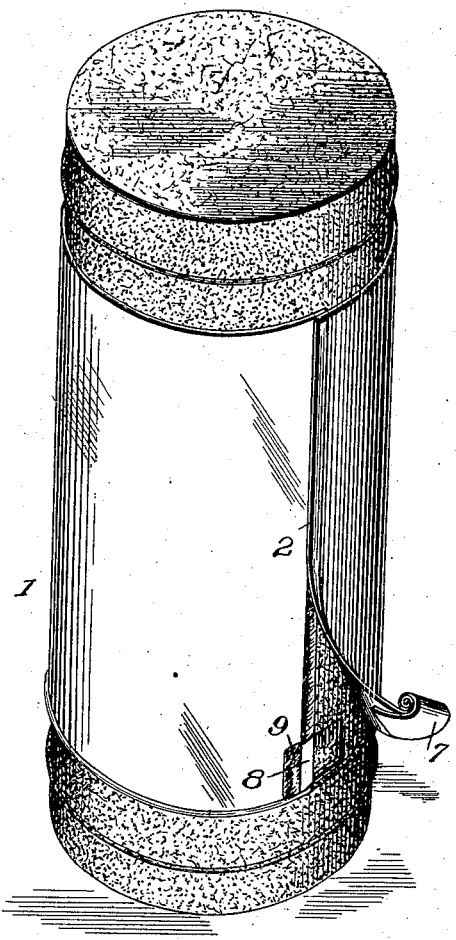
Witnesses
Inventor
George L. Zucker
By
Thos. E. Robertson
Attorney

UNITED STATES PATENT OFFICE.

GEORGE L. ZUCKER, OF EAST ORANGE, NEW JERSEY, ASSIGNOR TO THE GEORGE ZUCKER COMPANY, OF NEW YORK, N. Y., A CORPORATION.

PACKAGE.

SPECIFICATION forming part of Letters Patent No. 687,174, dated November 19, 1901.

Application filed August 14, 1901. Serial No. 72,022. (No model.)

*To all whom it may concern:*

Be it known that I, GEORGE L. ZUCKER, a citizen of the United States of America, and a resident of East Orange, in the county of Essex and State of New Jersey, have invented certain new and useful Improvements in Packages, of which the following is a specification.

This invention relates to an improvement in that class of packages or receptacles which are designed to be opened by ripping a band from the casing, thus severing one of the heads from the body of the receptacle.

My invention has for its object a receptacle which is capable of being entirely cut or ripped away from its contents, as it is necessary to do when the contents are of such a nature that they settle and slightly expand when they become cold and solid, and thus so firmly adhere to the casing that they cannot be removed by merely opening one end and attempting to withdraw the contents.

With this object before me my invention consists of a package wherein means are provided for ripping or cutting the longitudinal seam of a can, so that the shell can be opened and leave the contents free, and the preferable form of said invention is more fully hereinafter described and then definitely claimed at the end hereof.

In the accompanying drawings, which represent the preferable, though not necessary, embodiment of my invention, Figure 1 is a perspective view of my improved package, and Fig. 2 is a similar view of the same with the ends removed and the body partly opened.

Referring now to the details of the drawings by numerals, 1 represents the body of the can, which is formed with the longitudinal seam 2 and the usual annular scores 3 3, forming "ripping-bands" 4 4, which are provided with the ordinary tongues 5 5. Heads 6 6 of any desired form are secured to the body in the usual or any approved manner. The can so far described when made with a ripping-band at one end only is one of common form now in extensive use, and those familiar with them know that it is only necessary to engage the tongues 5 with a suitable key or a pair of pliers, and the ripping-bands 4 may be ripped or torn from the cylinder and wound upon the key, leaving the head severed from the body. I provide each end of the receptacle with one of these opening or ripping bands, and after the foregoing operation is performed at the opposite end we have a peculiar package consisting of a cylindrical shell closely fitting around the article or cake contained in the package, with the ends of the article projecting out of each end of the said cylindrical casing. If the article packed within the receptacle is of such a nature that it settles and expands slightly (instead of shrinking) in cooling, as is the case with some compounds for buffing and polishing metal-work, it is difficult or impossible to withdraw the cylindrical cake from the casing.

It is the object of my invention to provide means whereby the cake can be easily withdrawn for use, and to accomplish this I employ an opening-tongue 7, which is preferably made of a separate piece of metal and is inserted between the two longitudinal meeting edges of the can before the can is soldered. This opening-tongue 7 is preferably placed in close proximity or against one of the scores 3, and it will be obvious that when the longitudinal seam of the can is soldered no solder goes between the opening-tongue 7 and that part of the longitudinal seam marked 8, although a slight amount of solder may creep under the tongue at the point marked 9. Assuming now that one or both ends have been removed, it is only necessary to grasp the opening-tongue 7 with a suitable key or a pair of pliers, and by curling it on the key or pliers the longitudinal seam is started, and when it is once well started it may be easily broken for its entire length, when the cylindrical casing may easily be slipped from the cake contained within it. It is manifest that this tongue may be made in many ways and may be formed integral with the shell, if desired, and it may be made of various shapes or sizes, and while I do not limit my invention to the separate piece, as shown in my drawings, I very much prefer it, for the reason that the part that enters the receptacle between the shell and the cake within it affords a leverage by means of which the longitudinal seam may be started.

From the above and the accompanying drawings it will be seen that I have invented a receptacle that is an ideal one for packing substances that cannot easily be withdrawn from the receptacle, and at the same time a receptacle or package is provided that is practically indestructible.

I am aware that it is old in many instances to remove the cylindrical shell or casing of a can from its ends by rolling one edge of the can onto a key or other suitable tool, so that the longitudinal seam is stripped for its entire length all or substantially all at once, and I do not attempt to claim such as my invention, as I regard my can as essentially and materially different therefrom, inasmuch as in my invention the head of the can is first removed and then the longitudinal seam is severed progressively—i. e., by first severing the end of the seam and gradually stripping one edge of the seam from its companion edge.

What I claim as new is—

1. A can or receptacle having means for ripping off one end thereof, and means for stripping the longitudinal seam of the can, whereby the edges of said longitudinal seam may be spread apart after the head is removed and the seam is stripped; substantially as described.

2. A can or receptacle having means for ripping off one end thereof, and means for opening the longitudinal seam of the can by progressively stripping one edge of said seam from its companion edge; substantially as described.

3. A can or receptacle having a ripping-band near each end thereof whereby both ends may be removed, and means for opening the longitudinal seam left after the removal of said ends, by progressively stripping one edge of said longitudinal seam from its companion edge; substantially as described.

Signed by me at New York city, borough of Manhattan, this 12th day of August, 1901.

GEORGE L. ZUCKER.

Witnesses:
HENRY RINGHOF,
HENRY L. ZUCKER.